US008899215B2

(12) United States Patent
Sano et al.

(10) Patent No.: US 8,899,215 B2
(45) Date of Patent: Dec. 2, 2014

(54) EXHAUST GAS RECIRCULATION VALVE

(75) Inventors: Ryo Sano, Kariya (JP); Yusuke Niwa, Anjo (JP); Tetsuji Yamanaka, Obu (JP); Hiroki Shimada, Anjo (JP)

(73) Assignee: Denso Corporation, Kariya (JP)

( * ) Notice: Subject to any disclaimer, the term of this patent is extended or adjusted under 35 U.S.C. 154(b) by 288 days.

(21) Appl. No.: 13/430,777

(22) Filed: Mar. 27, 2012

(65) Prior Publication Data

US 2012/0247440 A1 Oct. 4, 2012

(30) Foreign Application Priority Data

Mar. 29, 2011 (JP) .................................. 2011-72821

(51) Int. Cl.
*F02M 25/07* (2006.01)
*F02B 47/08* (2006.01)

(52) U.S. Cl.
CPC ........... *F02M 25/0793* (2013.01); *Y02T 10/121* (2013.01); *F02M 25/0773* (2013.01)
USPC ..................................................... 123/568.17

(58) Field of Classification Search
CPC .......... F02M 25/0793; F02M 25/0797; F02M 25/0787
USPC ................. 123/188.8, 190, 337, 399, 568.17, 123/568.18; 251/305, 306
See application file for complete search history.

(56) References Cited

U.S. PATENT DOCUMENTS 6,932,051 B2 * 8/2005 Soshino et al. ............... 123/337
7,234,444 B2 * 6/2007 Nanba et al. .................. 123/337
7,540,278 B2 * 6/2009 Nanba ..................... 123/568.11
8,161,996 B2 * 4/2012 Barker et al. ................. 137/269
8,469,336 B2 * 6/2013 Nakamura et al. ............ 251/214
2002/0162985 A1 11/2002 Krause et al.
2007/0240690 A1 10/2007 Nanba
2008/0023664 A1 1/2008 Sakagami et al.
2011/0042599 A1 * 2/2011 Arai et al. ..................... 251/251

FOREIGN PATENT DOCUMENTS

JP 2001-132855 5/2001
JP 2004-332785 11/2004
JP 2007-040488 2/2007
JP 2007-285311 11/2007
JP 2008-133954 6/2008
JP 2011-43218 3/2011

OTHER PUBLICATIONS

Office Action (2 pages) dated Jan. 29, 2013, issued in corresponding Japanese Application No. 2011-072821 and English translation (2 pages).
Office Action (7 pages) dated Jan. 21, 2014, issued in corresponding Chinese Application No. 201210088906.4 and English translation (5 pages).
Second Office Action issued Sep. 4, 2014 in corresponding Chinese Application No. 201210088906.4 with English translation thereof.

* cited by examiner

*Primary Examiner* — Thomas Moulis
*Assistant Examiner* — Elizabeth Hadley
(74) *Attorney, Agent, or Firm* — Nixon & Vanderhye P.C.

(57) ABSTRACT

An EGR valve includes an aluminum valve body, an outer metal ring, an inner resin ring, a butterfly valve, and a seal ring. The valve body includes a gas passage therein. The gas passage is part of an EGR passage, through which EGR gas is returned from an exhaust passage to intake passage of an engine. The outer ring has a cylindrical shape, and is fixed and disposed on an inner wall of the gas passage. The inner ring has a cylindrical shape, and is disposed on an inner peripheral wall of the outer ring. The butterfly valve opens or closes an inside of the inner ring, and includes a seal fitting groove at an outer peripheral edge of the butterfly valve. The seal ring is fitted into the groove, and seals a clearance between the butterfly valve and the inner ring when the butterfly valve is closed.

4 Claims, 4 Drawing Sheets

EXHAUST GAS RECIRCULATION VALVE

CROSS REFERENCE TO RELATED APPLICATION

This application is based on Japanese Patent Application No. 2011-72821 filed on Mar. 29, 2011, the disclosure of which is incorporated herein by reference.

TECHNICAL FIELD

The present disclosure relates to an exhaust gas recirculation (EGR) valve which regulates an amount of EGR gas (part of exhaust gas) returned to an air-intake side of an engine (internal combustion engine which generates power as a result of combustion of fuel).

BACKGROUND

An engine disposed in a vehicle includes an exhaust gas recirculation system (EGR system) for returning EGR gas to its air intake side. The EGR system includes an EGR passage for guiding EGR gas from an exhaust passage of the engine to an intake passage; an EGR valve that regulates the amount of EGR gas in this EGR passage returned to the air intake side through the regulation of its opening degree; and an engine control unit (ECU) that performs control of the opening degree of this EGR valve (specifically, control of energization of an electric actuator disposed in the EGR valve).

A main feature of an EGR valve of a conventional technology will be described in reference to FIG. 4. In an EGR valve 101, a butterfly valve 106 (valving element having generally a shape of a disk) is arranged to be inclined relative to a shaft 110, and a seal ring 108 which prevents leakage at the time of valve closing is provided at an outer peripheral edge of the butterfly valve 106. The inside of a gas passage 102 is under a severe environment where the EGR gas flows and strongly-acid condensed water is thereby produced. For this reason, the seal ring 108 is formed from metal such as stainless steel which is excellent in acid resistance.

If a member in contact with the seal ring 108 is an aluminum material, from which a valve body 103 is made, a position of the valve body 103 in contact with the seal ring 108 is immediately corroded and worn out. Accordingly, in the previously proposed EGR valve 101, a bore ring (cylindrical nozzle) 9 made of stainless steel is disposed at the region in contact with the seal ring 108 so as to limit corrosion and wear of the region in sliding contact with the seal ring 108 (see, for example, JP-A-2007-285311).

In this manner, in the conventional EGR valve 101, every time the butterfly valve 106 is opened and closed, the seal ring 108 made of stainless steel and the bore ring 109 made of stainless steel are rubbed against each other. However, although the rubbing of stainless steels on each other limits their wear rather than rubbing between stainless steel and aluminum, two stainless steels are not a combination excellent in wear resistance.

Therefore, in the previously proposed EGR valve 101 in which the seal ring 108 made of stainless steel and the bore ring 109 made of stainless steel are rubbed against each other, there is concern that wear is caused due to its long-term use and EGR gas may leak from the worn-out region. If EGR gas leaks out of the worn-out region at the time of closing the EGR valve 101, the specified amount of fresh air (amount of air required by an ECU) cannot be ensured. As a result, there is concern about a defect such as reduction of engine output or an engine failure.

SUMMARY

According to the present disclosure, there is provided an exhaust gas recirculation (EGR) valve for an engine, including a valve body, an outer metal ring, an inner resin ring, a butterfly valve, and a seal ring. The valve body is made of aluminum, and includes a gas passage therein. The gas passage is a part of an EGR passage, through which EGR gas is returned from an exhaust passage to an intake passage of the engine. The outer metal ring has a cylindrical shape, and is fixed and disposed on an inner wall of the gas passage. The inner resin ring has a cylindrical shape, and is disposed on an inner peripheral wall of the outer metal ring. The butterfly valve is configured to open or close an inside of the inner resin ring, and includes a seal fitting groove at an outer peripheral edge of the butterfly valve. The seal ring is fitted into the seal fitting groove, and seals a clearance between the butterfly valve and the inner resin ring when the butterfly valve closes the inside of the inner resin ring.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
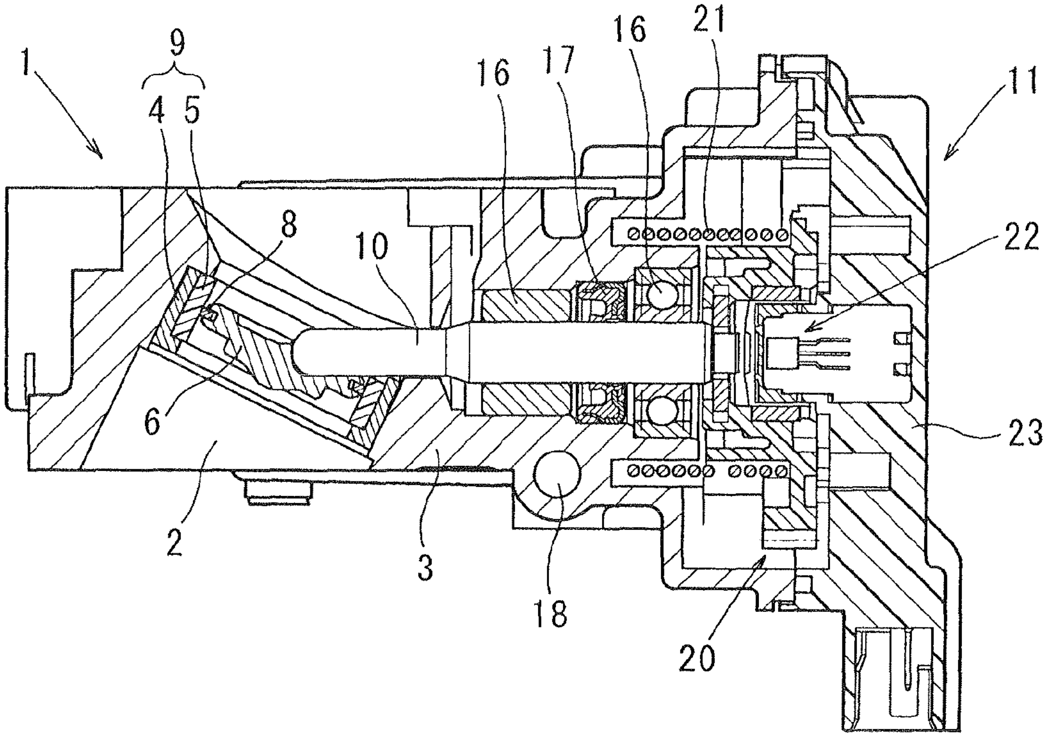
FIG. 1A is a sectional view illustrating an EGR valve in accordance with a first embodiment.

An EGR valve 1 includes a valve body 3, an outer metal ring 4, an inner resin ring 5, a butterfly valve 6, and a metal seal ring 8. The valve body 3 is made of aluminum (including aluminum alloy), and includes a gas passage 2 therein. EGR gas flows through the gas passage 2. The outer metal ring 4 has a cylindrical shape, and is fixed and disposed on an inner wall of the gas passage 2. The inner resin ring 5 has a cylindrical shape, and is disposed on an inner peripheral wall of the outer metal ring 4. The butterfly valve 6 opens or closes an inside of the inner resin ring 5, and includes a seal fitting groove 7 at an outer peripheral edge of the butterfly valve 6. The seal ring 8 is fitted into the seal fitting groove 7, and seals a clearance between the butterfly valve 6 and the inner resin ring 5 when the butterfly valve 6 closes the inside of the inner resin ring 5.

A specific example (embodiment) will be described below in reference to the accompanying drawings. The following embodiments disclose a specific example, and the present disclosure is obviously not limited to the embodiments. In the following embodiments, the same numerals indicate the same functional objects.

First Embodiment

Figure 1B:
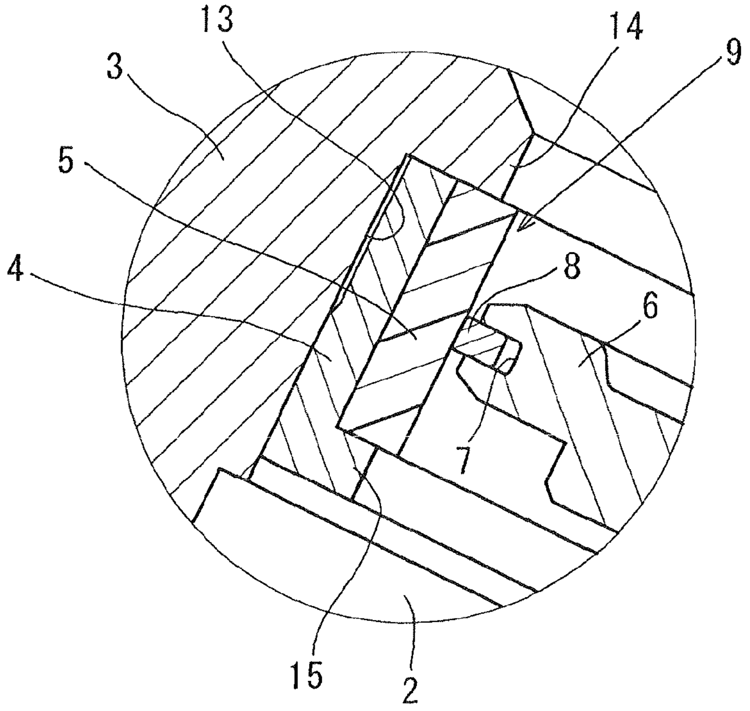
FIG. 1B is an enlarged view illustrating a main feature of the EGR valve in accordance with the first embodiment.
Figure 2:
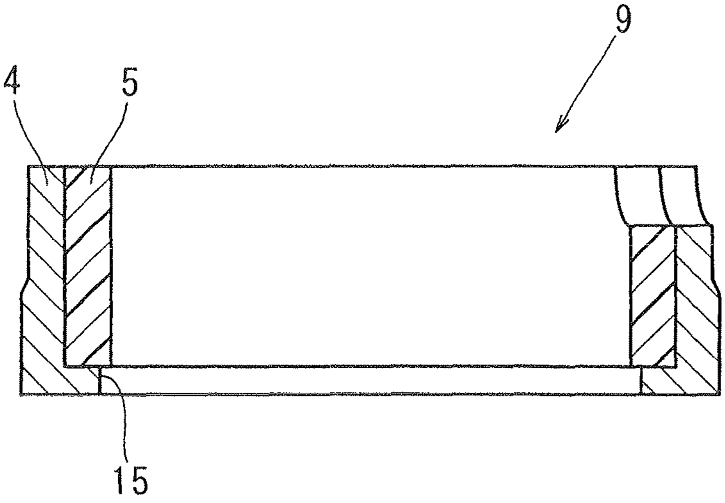
FIG. 2 is a sectional view illustrating a bore ring in accordance with the first embodiment.

A first embodiment will be described with reference to FIGS. 1A to 2. An EGR system is a widely-known technology for mixing the EGR gas, which is nonflammable gas, into a part of intake air by returning a part of the exhaust gas discharged from an engine, to an air intake side of the engine as EGR gas. The EGR system includes an EGR passage for returning a part of exhaust gas flowing through an exhaust passage into an intake passage, and an EGR valve 1 for regulating the amount of gas in this EGR passage through the adjustment of a valve opening degree. The degree of opening of this EGR valve 1 is controlled by an ECU in accordance with a traveling state of a vehicle.

The EGR valve 1 may be a high-pressure EGR valve disposed in a high-pressure EGR system which returns EGR gas to a downstream side of a throttle valve in the intake passage in an intake air flow direction. The EGR valve 1 may also be a low-pressure EGR valve disposed in a low-pressure EGR system which returns EGR gas to an upstream side of the throttle valve in the intake passage in the intake air flow direction (e.g., an upstream side of a compressor in the intake air flow direction in a case of a vehicle having a turbocharger).

A specific example of the EGR valve 1 will be described in reference to FIGS. 1A and 1B. The EGR valve 1 will be described below with its upper, lower, right, and left sides on the basis of FIGS. 1A and 1B. However, these upper, lower, right, and left sides are the directions for explanation of the embodiment, and arrangement of the EGR valve 1 is not limited to these directions. The EGR valve 1 includes a valve body 3 that has a gas passage 2 serving as a part of the EGR passage inside the valve body 3; a bore ring 9 fixed and disposed on an inner wall of the gas passage 2; a butterfly valve 6 that opens or closes the inside of this bore ring 9; a shaft 10 for rotatably supporting the butterfly valve 6 relative to the valve body 3; and an electric actuator 11 which applies driving force in a valve opening direction to the shaft 10.

The valve body 3 is made of aluminum, and the gas passage 2 through which EGR gas flows is formed inside the valve body 3.

The bore ring 9 includes an outer metal ring 4 having a generally cylindrical shape and made of metal, and an inner resin ring 5 having a cylindrical shape and made of resin which is press-fitted and fixed into this outer metal ring 4. By press-fitting and fixing an outer peripheral wall surface of the outer metal ring 4 around the inner wall of the gas passage 2, the bore ring 9 that consists of "the outer metal ring 4 and the inner resin ring 5" is fixed and disposed inside the valve body 3.

A specific example of the outer metal ring 4 will be described. The outer metal ring 4 is, for example, a cylindrical body made of stainless steel. A size of an upper outer diameter of the outer metal ring 4 is slightly smaller than a size of a press-fitting diameter of the inner wall of the gas passage 2. Accordingly, when the outer metal ring 4 is press-fitted into the gas passage 2, a small clearance is formed between the upper side of the outer metal ring 4 and the inner wall of the gas passage 2.

A press-fit wall 13 having a cylindrical shape, through which the bore ring 9 is press-fitted, is formed on the gas passage 2 of the valve body 3. A size of a lower outer diameter of the outer metal ring 4 is slightly larger than a size of a press-fitting diameter of the press-fit wall 13. Consequently, when the outer metal ring 4 is press-fitted into the gas passage 2, the lower side of the outer metal ring 4 is press-fitted around the press-fit wall 13. Therefore, a press-fit length of the bore ring 9 into the valve body 3 is set by a length of the lower part of the outer metal ring 4 in its axial direction.

The bore ring 9 is press-fitted upward from the lower side of the gas passage 2 (upstream side in the EGR gas flow direction). A body projection 14 in contact with an upper end portion of the bore ring 9 for positioning the bore ring 9 is formed at an upper end portion of the press-fit wall 13. This body projection 14 is an annular projection projecting radially inward of the gas passage 2, and has a function of preventing an upward movement of the inner resin ring 5 in addition to the function of a projection for positioning the bore ring 9. Specifically, a size of an inner diameter of the body projection 14 is larger than a size of an inner diameter of the inner resin ring 5 and equal to or smaller than a size of an outer diameter of the inner resin ring 5.

The inner resin ring 5 is press-fitted from the upper side toward lower side of the outer metal ring 4. A metal ring projection 15 in contact with a lower end portion of the press-fitted inner resin ring 5 for positioning the inner resin ring 5 is formed at a lower end portion of the outer metal ring 4. This metal ring projection 15 is a radially inwardly projecting annular projection, and has a function of preventing a downward movement of the inner resin ring 5 as well as the function of a projection for positioning the inner resin ring 5. Specifically, a size of an inner diameter of the metal ring projection 15 is larger than the size of the inner diameter of the inner resin ring 5 and equal to or smaller than the size of the outer diameter of the inner resin ring 5. Thus, the inner resin ring 5 is clamped between the body projection 14 provided for the valve body 3 and the metal ring projection 15 provided for the outer metal ring 4 with the bore ring 9 press-fitted in the gas passage 2.

A specific example of the inner resin ring 5 will be described. This inner resin ring 5 is as described above, a cylindrical body press-fitted and fixed on an inner peripheral wall of the outer metal ring 4, and is formed from hard resin (e.g., non-thermoplastic polyimide resin) that is excellent in heat resistance, corrosion resistance and so forth.

An outer peripheral surface of the inner resin ring 5 is finished into a smooth surface having a constant diameter (slightly larger than an outer diameter size of the inner peripheral wall of the outer metal ring 4, which is press-fitted) through cutting and polishing (grinding) work. The outer peripheral surface of the inner resin ring 5 is press-fitted through the inner peripheral wall of the outer metal ring 4, so that the inner resin ring 5 is fixed to the outer metal ring 4. Furthermore, the outer metal ring 4 and the inner resin ring 5 are closely-attached on each other along their whole circumference so as to reliably prevent a leakage of EGR gas. On the other hand, after being press-fitted into the outer metal ring 4, the inner circumferential surface of the inner resin ring 5 is finished into a smooth surface having a constant diameter (slightly smaller than an outer diameter size of a free length of the seal ring 8 which is described in greater detail hereinafter) through cutting and polishing work.

The butterfly valve 6 is disposed in the bore ring 9, and is for regulating the amount of EGR gas returned to the intake passage through the opening control of the inside of the bore ring 9. This butterfly valve 6 has a generally disc shape, and is formed from a member (e.g., stainless steel) which is excellent in heat resistance, corrosion resistance. The butterfly valve 6 is fixed to a left end of the shaft 10 by a joining technology such as welding, and is cantilever-supported by the shaft 10.

The seal ring 8 for sealing for sealing a clearance between the butterfly valve 6 and the inner peripheral wall of the bore ring 9 (specifically, inner peripheral wall of the inner resin ring 5) at the time of fully-closing of the valve 6 is provided on the outer peripheral edge of the butterfly valve 6. The seal ring 8 is fitted in a seal fitting groove 7 that is formed on the outer peripheral edge of the butterfly valve 6 along its whole circumference. This seal ring 8 is obtained by providing a wiring material formed from a metallic material such as stainless steel and having a quadrangular shape in cross-section, in an annular shape. A closed gap (separation part in the circumferential direction) for compensating a difference between the inner diameter of the inner resin ring 5 and the outer diameter of the free length of the seal ring 8 is provided for the seal ring 8 at its one point in the circumferential direction. The seal ring 8 may be a member without a closed gap. For example, the seal ring 8 is formed from a ring member made of a stainless mesh.

The shaft 10 cantilever-supports the butterfly valve 6, and is rotatably supported by means of two bearings 16 (e.g., metal bush and ball bearing) away from each other in the axial direction. The shaft 10 is a generally cylindrical rod formed from a member (e.g., stainless steel) which is excellent in heat resistance, corrosion resistance. The butterfly valve 6 is arranged to be inclined relative to the axis line of the shaft 10.

A sealing member 17 (e.g., lip seal) for preventing a leakage of EGR gas to an inner part of the electric actuator 11 (space accommodating a gear and motor and so forth) is disposed between the shaft 10 and the valve body 3. A coolant circuit 18 through which engine coolant circulates is provided inside the valve body 3, and the circuit 18 is formed to limit the transmission of heat of EGR gas toward the electric actuator 11.

The electric actuator 11 is disposed at a right part of the valve body 3 for rotating the butterfly valve 6 via the shaft 10. The actuator 11 includes an electric motor which generates rotative power upon energization of the motor (e.g., widely-known direct-current motor which generates rotary torque in accordance with the energizing amount); a deceleration device 20 (e.g., gear-type speed reducer obtained by combination of gears) which amplifies the rotary torque of this electric motor and transmits the torque to the shaft 10; a return spring 21 which gives force for returning the butterfly valve 6 to its fully-closed side to the shaft 10; and a rotational angle sensor 22 which detects the degree of opening of the butterfly valve 6 from an angle of the shaft 10 (e.g., magnetic rotational angle sensor which detects the angle of the shaft 10 in a non-contact manner). A numeral 23 in FIG. 1A indicates a cover that is fastened to the right part of the valve body 3 for accommodating the electric actuator 11.

Through the energization control of the electric motor by the ECU, the opening degree of the butterfly valve 6 is controlled via the shaft 10, and the amount of EGR gas returned to the engine is thereby regulated. Specifically, the ECU is a widely-known electronic control unit having a microcomputer. The ECU performs the energization control of the electric motor such that an actual opening degree of the butterfly valve 6 (shaft 10) detected by the rotational angle sensor 22 reaches a target opening degree calculated in accordance with the vehicle traveling state.

A first effect of the first embodiment will be described. In the EGR valve 1 of the present embodiment, as described above, the bore ring 9 is constituted of a double structure of "the outer metal ring 4 and the inner resin ring 5". The bore ring 9 is fixed to the valve body 3 by means of the outer metal ring 4, and the inner resin ring 5 is used for a sliding contact of the ring 9 on the seal ring 8. Accordingly, as a result of the sliding of the seal ring 8 made of stainless steel on the inner resin ring 5 made of resin, wear of the sliding part between the seal ring 8 and the bore ring 9 can be limited. Therefore, even if the EGR valve 1 is used for a long period of time, the generating of wear can be restrained so that reliability of the EGR valve 1 can be improved.

In addition, the reason that the wear of the inner resin ring 5 can particularly be limited at the sliding part between the seal ring 8 made of stainless steel and the inner resin ring 5 made of resin may be, for example, because in the case of the rings 8, 5 being made of the same type of metallic materials (stainless-stainless), both the rings stick on each other to facilitate the wear, whereas in the case of different materials (resin-metal), these situations are not caused; the resin is more flexible than metal, so that the ring 5 mitigates an impact made by the press of the seal ring 8 on the ring 5; and a friction coefficient of the resin is small.

A second effect of the first embodiment will be described. In the EGR valve 1 of the present embodiment, as described above, the inner resin ring 5 is press-fitted and fixed in the inner peripheral surface of the outer metal ring 4. Accordingly, the inner resin ring 5 is formed separately from the outer metal ring 4. Thus, despite a resin material which is difficult to be injected for molding inward of the outer metal ring 4, this resin material can be used as the inner resin ring 5.

A third effect of the first embodiment will be described. In the EGR valve 1 of the present embodiment, as described above, after the inner resin ring 5 is press-fitted into the inner peripheral surface of the outer metal ring 4, the inner peripheral surface of the inner resin ring 5 is cut and polished. Accordingly, precision in the inner diameter size and roundness of the inner resin ring 5, with which the seal ring 8 is in sliding contact, can be improved. As a result, a valve leakage due to the reduction of precision of the inner resin ring 5 can be prevented.

A fourth effect of the first embodiment will be described. In the EGR valve 1 of the present embodiment, as described above, the outer metal ring 4, which is provided with the inner resin ring 5, is fixed into the gas passage 2 through press-fitting. Accordingly, the outer metal ring 4 receives a load by the press-fitting of the ring 4 into the gas passage 2, so that the reduction of the precision in the inner diameter size and roundness of the inner resin ring 5 by the load due to the press-fitting can be prevented.

A fifth effect of the first embodiment will be described. In the EGR valve 1 of the present embodiment, as described above, as a result of the press-fitting of the outer metal ring 4 into the gas passage 2, the inner resin ring 5 is clamped between the body projection 14 of the valve body 3 and the metal ring projection 15 of the outer metal ring 4. In this manner, the inner resin ring 5 is located between the body projection 14 and the metal ring projection 15, so that the inner resin ring 5 can be held reliably at its predetermined attachment position even if a press-fitting part of the inner resin ring 5 into the outer metal ring 4 is made small because of creep and linear expansion. Consequently, despite the use of the valve 1 over a long period of time, defects such as a position shift of the inner resin ring 5 and separation of the inner resin ring 5 can be obviated.

Second Embodiment

Figure 3A:
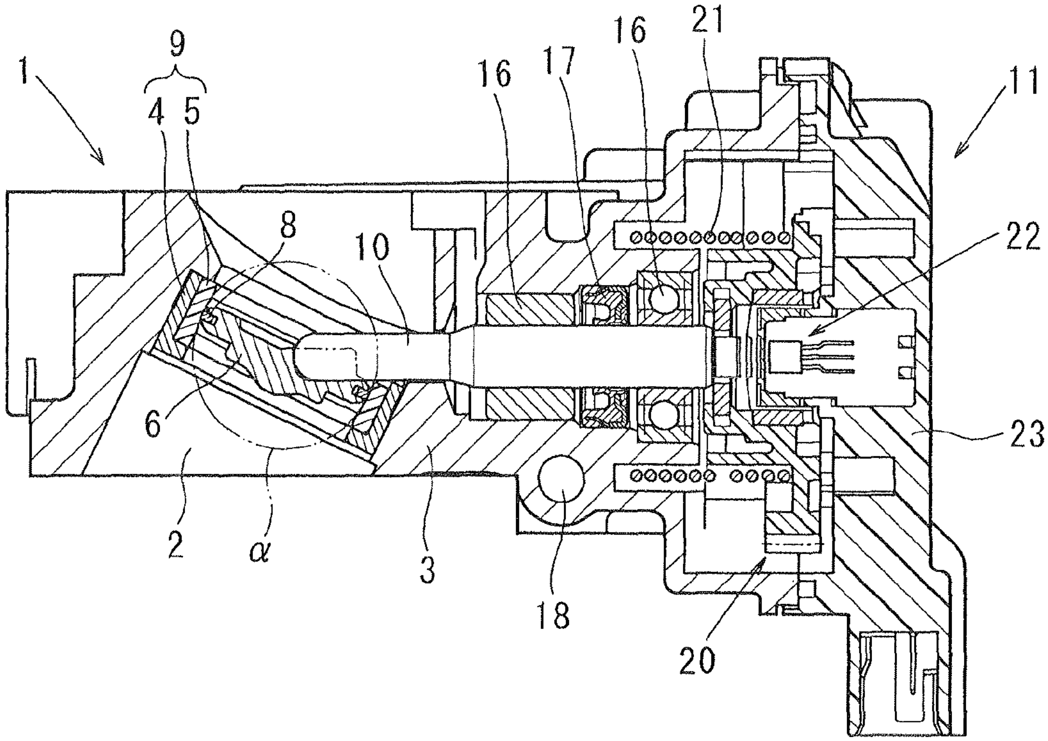
FIG. 3A is a sectional view illustrating an EGR valve in accordance with a second embodiment.
Figure 3B:
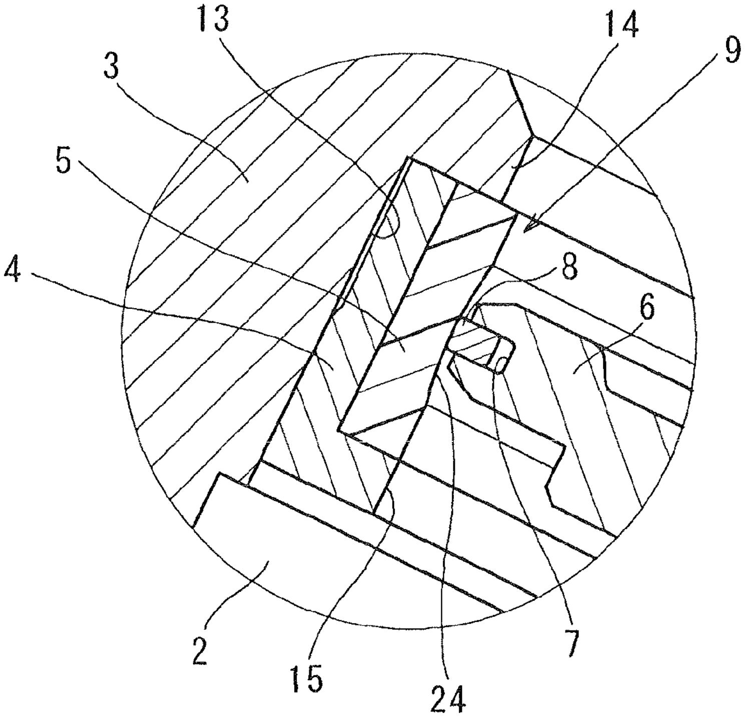
FIG. 3B is an enlarged view illustrating a main feature of the EGR valve in accordance with the second embodiment.
Figure 4:
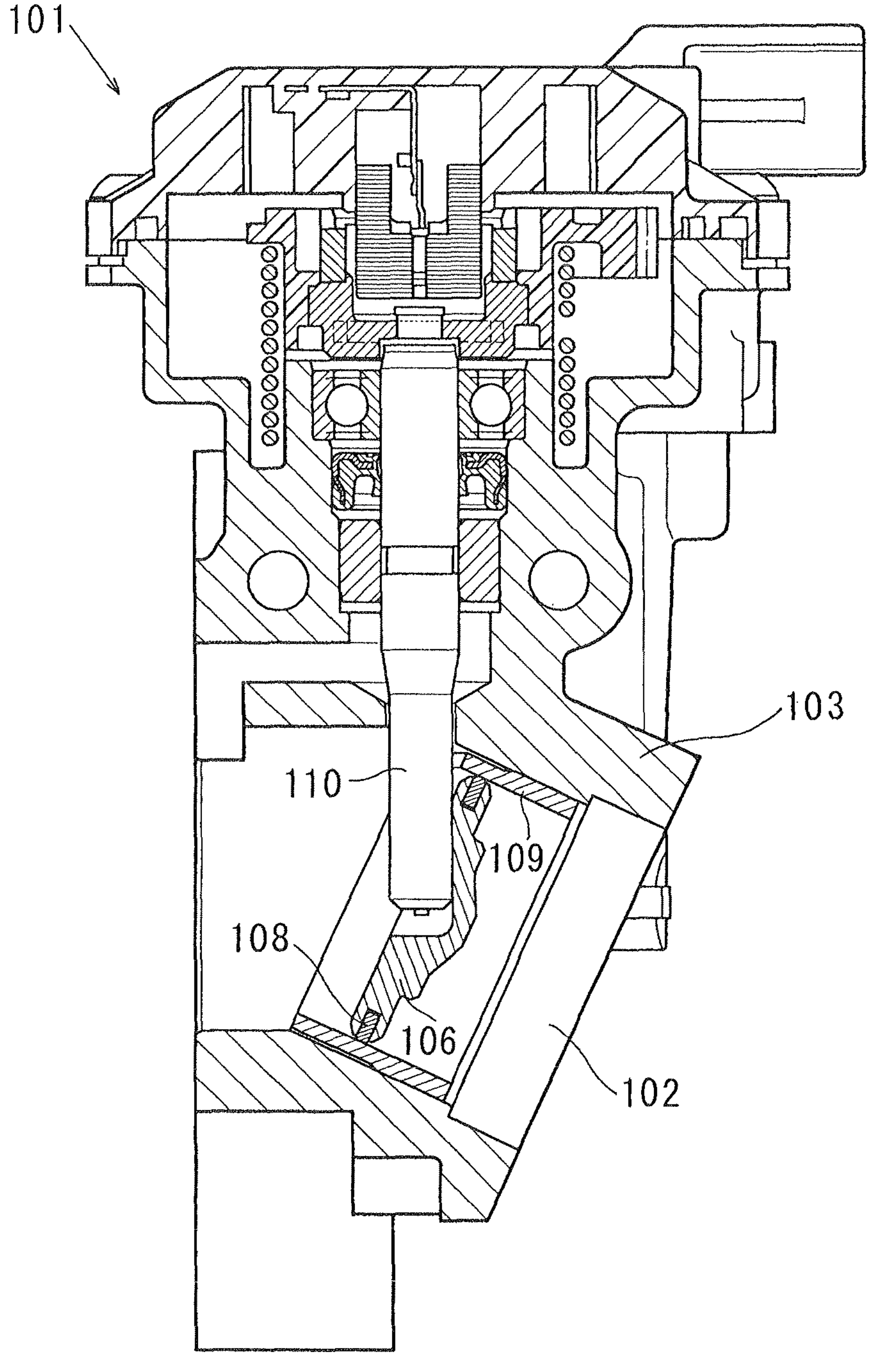
FIG. 4 PRIOR ART
FIG. 4 is a sectional view illustrating a previously proposed EGR valve.

A second embodiment will be described with reference to FIGS. 3A and 3B. In the following embodiment, the same numeral as in the above first embodiment indicates its corresponding functional component. In this second embodiment, a sliding surface 24 of an inner resin ring 5, with which a seal ring 8 is in sliding contact, is formed into a spherical surface (see an alternate long and two short dashes line $\alpha$ in FIG. 3A) with the rotation center of a butterfly valve 6 being the center point of the sphere. This sliding surface 24 is formed through cutting and polishing work after the inner resin ring 5 is press-fitted into an inner peripheral surface of an outer metal ring 4. The sliding surface 24 is finished into a smooth surface with high precision. A specific size of inner diameter of the spherical surface (diameter dimension) is slightly smaller than an outer diameter size of a free length of the seal ring 8. The size of inner diameter of the spherical surface is set such that the seal ring 8 is in contact with the sliding surface 24 along its whole circumference at the time of closing of the valve 6.

A first effect of the second embodiment will be described. As described above, the sliding surface 24 of the inner resin ring 5, with which the seal ring 8 is in sliding contact, is formed into a spherical surface with the rotation center of the butterfly valve 6 used as the center point of the sphere. Accordingly, at the time of closing of the valve 6, despite a small amount of a shift of an opening degree of the butterfly valve 6, the seal ring 8 is in contact with the inner resin ring 5 along its whole circumference. Therefore, leakage of EGR gas can be prevented and reliability of an EGR valve 1 can be improved.

A second effect of the second embodiment will be described. In addition, the sliding surface 24 of the inner resin ring 5, with which the seal ring 8 is in sliding contact, is formed into a spherical surface with the rotation center of the butterfly valve 6 used as the center point of the sphere. Accordingly, a sliding area between the seal ring 8 and the inner resin ring 5 is increased. Thus, the wear due to the sliding between the seal ring 8 and the inner resin ring 5 can be further limited, and a defect of a leak of EGR gas from a worn-out region over a long time is made avoidable.

Industrial applicability of the valve 1 will be described. In the above embodiments, it is illustrated that the inner resin ring 5 is press-fitted and fixed in the outer metal ring 4. Alternatively, the inner resin ring 5 may be fixed and disposed in the outer metal ring 4 by means of thermal insert technology (technology of increase of diameter of the outer metal ring 4 by its heating to fix the inner resin ring 5). Or, the inner resin ring 5 may be formed in the outer metal ring 4 through injection-molding of the inner resin ring 5 into the outer metal ring 4. At the time of injection-molding of the inner resin ring 5 into the outer metal ring 4, an annular groove, or depressions and projections may be formed on a surface where the outer metal ring 4 and the inner resin ring 5 are in contact, to lengthen a distance along which the outer metal ring 4 and the inner resin ring 5 are in contact. As a result, a leak of EGR gas from the joining part between the outer metal ring 4 and the inner resin ring 5 is prevented.

To sum up, the EGR valve 1 in accordance with the above embodiments can be described as follows.

In the EGR valve 1, the bore ring 9 is configured using a double structure made up of "the outer metal ring 4 and the inner resin ring 5". The bore ring 9 is fixed to the valve body 3 by means of the outer metal ring 4, and the inner resin ring 5 is used for a sliding contact of the ring 9 with the seal ring 8. Accordingly, the seal ring 8 slides on the inner resin ring 5 made of resin, so that wear of the sliding part is restrained. Therefore, even if the EGR valve 1 is used for a long period of time, the generating of wear can be restrained so that reliability of the EGR valve 1 can be improved.

The inner resin ring 5 is fixed to the inner peripheral surface of the outer metal ring 4 through press-fitting. Because the inner resin ring 5 is formed separately from the outer metal ring 4, a degree of flexibility in forming of the inner resin ring 5 can be improved. Thus, despite a resin material which is difficult to be injected for molding inward of the outer metal ring 4, this resin material can be formed into the inner resin ring 5. As a result, despite the limited number of types of resin materials applicable to the EGR valve 1, the inner resin ring 5 can be formed from this limited number of types of resin materials.

After the inner resin ring 5 is press-fitted along the inner peripheral surface of the outer metal ring 4, the inner peripheral surface of the inner resin ring 5 is cut and polished. Accordingly, precision in the inner diameter size and roundness of the inner resin ring 5, with which the seal ring 8 is in sliding contact, can be improved. Thus, a valve leakage due to the precision reduction can be prevented.

The outer metal ring 4, which is provided with the inner resin ring 5, is fixed in the gas passage 2 of the valve body 3 by press-fitting. As a result of such a configuration, the outer metal ring 4 receives a load produced by the press-fitting of the ring 4, so that the reduction of the precision in the inner diameter size and roundness of the inner resin ring 5 by the load due to the press-fitting can be prevented.

The inner resin ring 5 is clamped between the body projection 14 of the valve body 3 and the metal ring projection 15 of the outer metal ring 4. In this manner, the inner resin ring 5 is located between the body projection 14 and the metal ring projection 15, so that the inner resin ring 5 can be held reliably at its predetermined attachment position even if a press-fitting area of the inner resin ring 5 into the outer metal ring 4 is made small because of creep and linear expansion. Consequently, despite the use of the valve 1 over a long period of time, defects such as a position shift of the inner resin ring 5 and separation of the inner resin ring 5 can be obviated.

The sliding surface 24 of the inner resin ring 5, with which the seal ring 8 is in sliding contact, is a spherical surface with the rotation center of the butterfly valve 6 used as the center point of the sphere. Accordingly, at the time of closing of the valve 6, despite a small amount of a shift of an opening degree of the butterfly valve 6, the seal ring 8 can be in contact with the inner resin ring 5 (specifically sliding surface 24) along its whole circumference, and a leakage of EGR gas can thereby be prevented. In addition, since a sliding area between the seal ring 8 and the inner resin ring 5 is increased, the wear due to the sliding between the seal ring 8 and the inner resin ring 5 can be further limited.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An exhaust gas recirculation (EGR) valve for an engine, comprising:

a valve body that is made of aluminum and includes a gas passage therein, wherein the gas passage is a part of an EGR passage, through which EGR gas is returned from an exhaust passage to an intake passage of the engine;

an outer metal ring that has a cylindrical shape and is fixed and disposed on an inner wall of the gas passage;

an inner resin ring that has a cylindrical shape and is disposed on an inner peripheral wall of the outer metal ring;

a butterfly valve that is configured to open or close an inside of the inner resin ring and includes a seal fitting groove at an outer peripheral edge of the butterfly valve; and a seal ring that is fitted into the seal fitting groove and seals a clearance between the butterfly valve and the inner resin ring when the butterfly valve closes the inside of the inner resin ring, wherein the inner resin ring is fixed on an inner peripheral wall of the outer metal ring by press-fitting and clamped between a body projection provided for the valve body and a metal ring projection provided for the outer metal ring.

2. The EGR valve according to claim 1, wherein an inner peripheral surface of the inner resin ring is cut and ground after the inner resin ring is press-fitted to the inner peripheral surface of the outer metal ring.

3. The EGR valve according to claim 2, wherein the outer metal ring, to which the inner resin ring is press-fitted, is fixed on the inner wall of the gas passage of the valve body by press-fitting.

4. The EGR valve according to claim 1, wherein:

the inner resin ring includes a sliding surface with which the seal ring is in sliding contact; and the sliding surface is a surface of a sphere with a rotation center of the butterfly valve used for a center point of the sphere.

* * * * *